(12) United States Patent
Graichen et al.

(10) Patent No.: US 9,068,535 B2
(45) Date of Patent: Jun. 30, 2015

(54) VARIABLE FLOW VALVE FOR TURBOCHARGERS

(71) Applicants:Brian Graichen, Leonard, MI (US); Dave Fletcher, Flint, MI (US); Craig Markyvech, Romulus, MI (US)

(72) Inventors: Brian Graichen, Leonard, MI (US); Dave Fletcher, Flint, MI (US); Craig Markyvech, Romulus, MI (US)

(73) Assignee: Dayco IP Holdings, LLC, Springfield, MO (US)

( * ) Notice: Subject to any disclaimer, the term of this patent is extended or adjusted under 35 U.S.C. 154(b) by 209 days.

(21) Appl. No.: 13/921,473

(22) Filed: Jun. 19, 2013

(65) Prior Publication Data

US 2013/0340428 A1 Dec. 26, 2013

Related U.S. Application Data

(60) Provisional application No. 61/662,255, filed on Jun. 20, 2012.

(51) Int. Cl.
| | |
|---|---|
| *F02B 33/44* | (2006.01) |
| *F02M 25/07* | (2006.01) |
| *F16K 37/00* | (2006.01) |
| *F02B 37/16* | (2006.01) |
| *F02B 37/18* | (2006.01) |

(52) U.S. Cl.
CPC ....... *F02M 25/0709* (2013.01); *F02M 25/0772* (2013.01); *F16K 37/0033* (2013.01); *F02M 25/0713* (2013.01); *F16K 37/0041* (2013.01); *Y02T 10/121* (2013.01); *F02B 37/16* (2013.01); *F02B 37/18* (2013.01); *Y02T 10/144* (2013.01)

(58) Field of Classification Search
CPC .......... F02M 25/0709; F02M 25/0772; F02M 25/0713; F16K 37/0033; F16K 37/0041; F02B 37/16; F02B 37/18; Y02T 10/144; Y02T 10/121
USPC ............. 60/611, 605.1; 137/541; 251/129.04, 251/30.02, 30.01, 43
See application file for complete search history.

(56) References Cited

U.S. PATENT DOCUMENTS

| | | | |
|---|---|---|---|
| 3,973,729 | A | 8/1976 | Sliger |
| 4,671,123 | A | 6/1987 | Magnussen, Jr. et al. |

(Continued)

OTHER PUBLICATIONS

International Search Report and Written Opinion, PCT/US2013/046503 (Dec. 12, 2013).

*Primary Examiner* — Thomas Denion
*Assistant Examiner* — Vikansha Dwivedi
(74) *Attorney, Agent, or Firm* — Thompson Hine LLP

(57) ABSTRACT

A variable flow valve with position feedback is disclosed. The variable flow valve includes a housing having an inlet port and a discharge port and one or more control ports, and also includes a piston connected to a primary valve to open and close fluid communication between an inlet port and a discharge port of the housing. The housing and the piston intermesh to define an inner chamber and an outer chamber each in fluid communication with its own control port. A control port valve opens and closes at least one of the control ports to control access to a source of pressure change. A position sensor is part of the position feedback and communicates the position of the primary valve, relative to the discharge port, to a controller that operates the control port valve to hold the primary valve in a position where the discharge port is partially open.

14 Claims, 3 Drawing Sheets

OPEN VALVE

(56) References Cited

U.S. PATENT DOCUMENTS

| | | |
|---|---|---|
| 5,462,343 A | 10/1995 | Yoshida et al. |
| 5,669,364 A | 9/1997 | Everingham |
| 5,960,824 A | 10/1999 | Sullivan |
| 6,089,019 A | 7/2000 | Roby |
| 6,318,085 B1 * | 11/2001 | Torno et al. ............ 60/611 |
| 6,722,128 B1 | 4/2004 | Adrian |
| 6,863,260 B2 | 3/2005 | Medina |
| 6,938,420 B2 * | 9/2005 | Kawamura et al. ........... 60/612 |
| 7,100,584 B1 * | 9/2006 | Bruestle et al. ............ 123/563 |
| 7,481,056 B2 | 1/2009 | Blaylock et al. |
| 7,802,588 B2 | 9/2010 | Doutt |
| 8,469,333 B2 | 6/2013 | Medina |
| 2006/0086918 A1 | 4/2006 | Koyama |
| 2007/0227142 A1 | 10/2007 | Blaylock et al. |
| 2008/0022679 A1 | 1/2008 | Hara et al. |
| 2012/0198837 A1 | 8/2012 | Medina |
| 2014/0096675 A1 | 4/2014 | Fletcher et al. |
| 2014/0271234 A1 * | 9/2014 | Markyvech et al. ........... 417/45 |

* cited by examiner

OPEN VALVE

CLOSED VALVE

VARIABLE FLOW VALVE FOR TURBOCHARGERS

RELATED APPLICATIONS

This application claims the benefit of U.S. Provisional Application No. 61/662,255, filed Jun. 20, 2012.

TECHNICAL FIELD

This application relates to variable flow valves, more particularly, to such a valve having position control and metered control of the flow of fluids through the valve, including valves such as a compressor recirculation valve.

BACKGROUND

Internal combustion engines, its mechanisms, refinements and iterations are used in a variety of moving and non-moving vehicles or housings. Today, for examples, internal combustion engines are found in terrestrial passenger and industrial vehicles, marine, stationary and aerospace applications. There are generally two dominant ignition cycles commonly referred to as gas and diesel, or more formally as spark ignited (SI) and compression ignition (CI), respectively. More recently, exhaust-driven turbochargers have been incorporated into the system connected to the internal combustion engine to improve the power output and overall efficiency of engine.

Currently available valves used in turbocharger systems of internal combustion engines, such as a compressor bypass valve, operate such that they are either open or closed in response to changes within the system. These valves do not provide active control of the position of the valve.

Herein compressor recirculation valves are disclosed that allow original equipment manufacturers ("OEMs") or anyone using a turbocharger to actively control the position of this valve with precision not before envisioned. This level of control has the objective of more precise control of turbo speeds, which allows OEMS or others to keep the turbo speed higher and thereby reduce turbo response time and turbo lag and improve fuel economy and drivability of the vehicle.

SUMMARY

In one aspect, internal combustion engines having an exhaust driven turbocharger system are disclosed that include a variable flow valve. In one embodiment, the variable flow valve may be a compressor bypass valve, but is not limited thereto. In the system the variable flow valve assists in controlling the exhaust driven turbocharging system. The turbocharger has its compressor outlet connected in fluid communication to the variable flow valve and also to an air inlet of an engine. The variable flow valve includes a position sensor that senses the position of the primary valve therein and communicates this position to a controller to control the opening and closing of the variable flow valve. In particular, the primary valve may be held in a position where the discharge port is partially open thereby affecting the flow of air into the air inlet of the engine.

The variable flow valve include a housing having an inlet port and a discharge port and one or more control ports, and also includes a piston connected to a primary valve to open and close fluid communication between an inlet port and a discharge port of the housing to make the variable control possible. Here, the housing and the piston intermesh to define an inner chamber and an outer chamber each in fluid communication with its own control port. A control port valve opens and closes at least one of the control ports to control access to a source of pressure change. A position sensor is also part of the variable flow valve to communicate the position of the primary valve, relative to the discharge port, to a controller that operates the control port valve to hold the primary valve in the partially open position.

DETAILED DESCRIPTION

Figure 1:
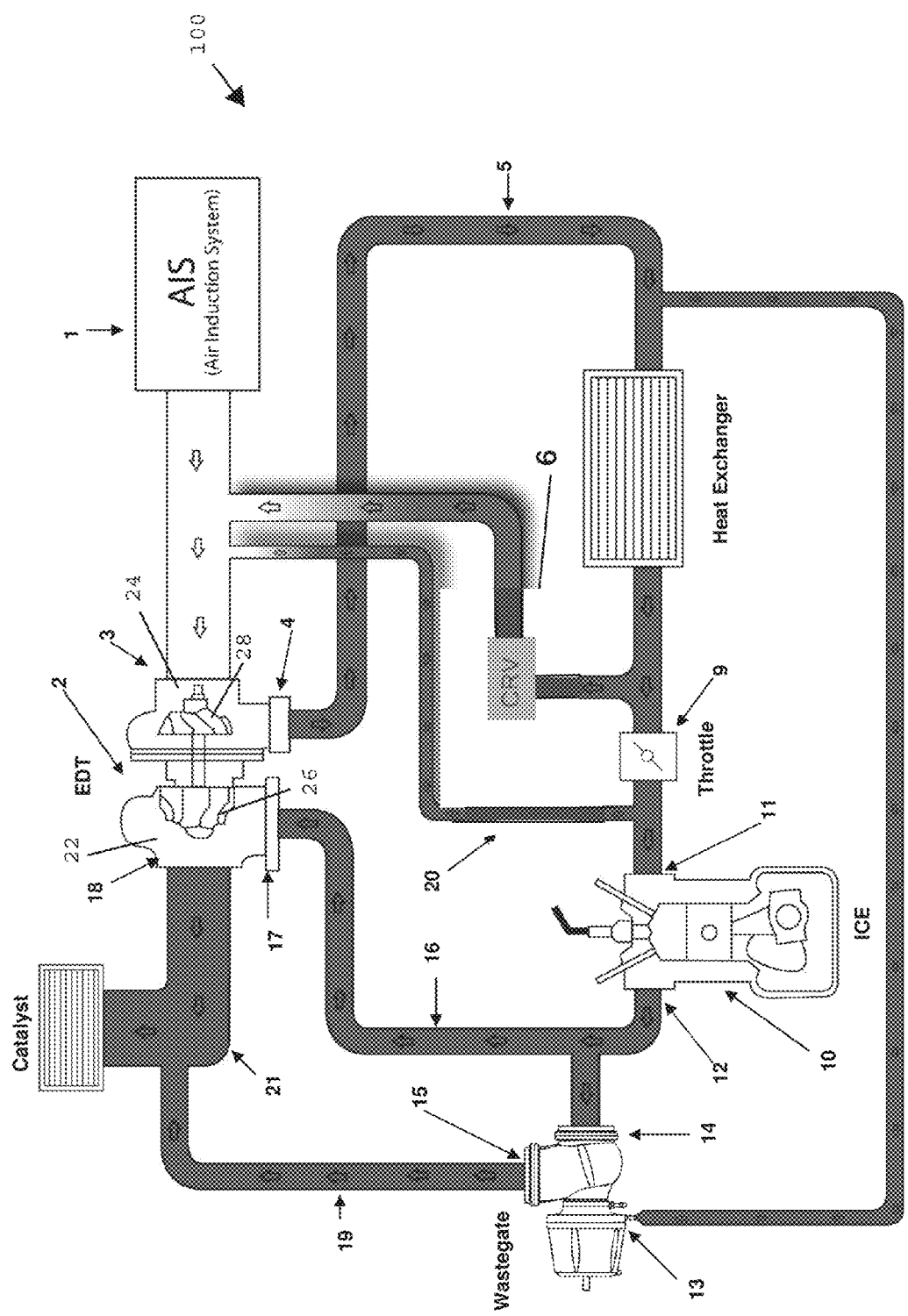
FIG. 1 is a diagram including flow paths and flow directions of one embodiment of an internal combustion engine turbo system that includes a compressor recirculation valve ("CRV").

The following detailed description will illustrate the general principles of the invention, examples of which are additionally illustrated in the accompanying drawings. In the drawings, like reference numbers indicate identical or functionally similar elements.

FIG. 1 illustrates one embodiment of an internal combustion engine turbo system, generally designated 100. The turbo system 100 includes the following components in controlling the operating parameters of a turbocharger: an exhaust-driven turbo charger ("EDT") 2 with a turbine section 22 and compressor section 24, a turbine bypass valve commonly referred to as a wastegate 13, and a compressor recirculation valve 6 (shown in detail in FIGS. 2 and 3). The EDT includes an exhaust housing 17, 18 containing a turbine wheel 26 that harnesses and converts exhaust energy into mechanical work through a common shaft to turn a compressor wheel 28 that ingests air, compresses it and feeds it at higher operating pressures into the inlet 11 of the internal combustion engine 10.

Still referring to FIG. 1, the wastegate 13 is a control valve used to meter the exhaust volume 16 coming from the exhaust manifold 12 of the internal combustion engine 10 and the energy available to power the EDT turbine wheel 26. The wastegate 13 works by opening a valve (not shown) to bypass 19 so that exhaust flows away from the turbine wheel 26, thereby having direct control over the speed of the EDT 2 and the resultant operating pressure of the ICE intake manifold. The wastegate 13 may have any number of embodiments, including the embodiments disclosed in applicant's U.S. patent application Ser. No. 12/717,130, which is incorporated by reference herein in its entirety.

In any EDT system, there exists operating pressures in the compressor inlet 3, intake manifold 5, 11 (IM), exhaust manifold 12, 16 (EM) and exhaust 18, 21. With respect to FIG. 1, the EDT compressor inlet is defined as the passageway from the air intake system 1 to the inlet 3 of the EDT compressor section 24, typically operating at an ambient pressure in a single stage EDT system. The engine's inlet manifold is defined as the passages between the EDT compressor discharge 4 and the ICE intake valve(s) 11. The engine's exhaust manifold is defined as the passages between the ICE exhaust valve 12 and the EDT turbine inlet 17. The exhaust is broadly defined as any passageway after the EDT turbine discharge 18. In order to achieve effective exhaust gas recirculation (EGR), the pressures in the exhaust manifold should be significantly higher than the pressures found in the inlet manifold in order for exhaust gas to flow in that direction. The design of EDT and the varied combinations that exist of compressor and exhaust sizes is extensive. To summarize, smaller EDT exhaust profiles produce higher desired exhaust manifold pressures at the expense of lower efficiencies. One can appreciate that engineers in the art weigh a fine balance between achieving efficiency and EGR effectiveness.

By definition, the compressor recirculation valve 6 is a regulating valve located in the passageway 5 between the discharge port 4 (also called an exhaust outlet) of a compressor section 24 of the EDT 2, be it exhaust or mechanically driven, and the ICE inlet 11. In the enlarged views in FIGS. 2 and 3, the CRV 6 includes a discharge port 8. The discharge port 8 may be, but is not limited to, one that is vented to atmosphere or re-circulated back into the compressor's ambient inlet 3 (as shown in FIG. 1).

A CRV may be used on a spark ignited ICE with a throttle plate 9 as depicted in FIG. 1. At any given ICE operating range, the EDT can be spinning up to 200,000 revolutions per minute (RPM). The sudden closing of the throttle 9 does not immediately decelerate the RPM of the EDT 2. Therefore, this creates a sudden increase in pressure in the passages between the closed throttle and EDT compressor section 24 such as passage 5. The CRV 6 functions by relieving, or bypassing this pressure back to the flow path between the air induction system 1 and the compressor section 24.

Figure 2:
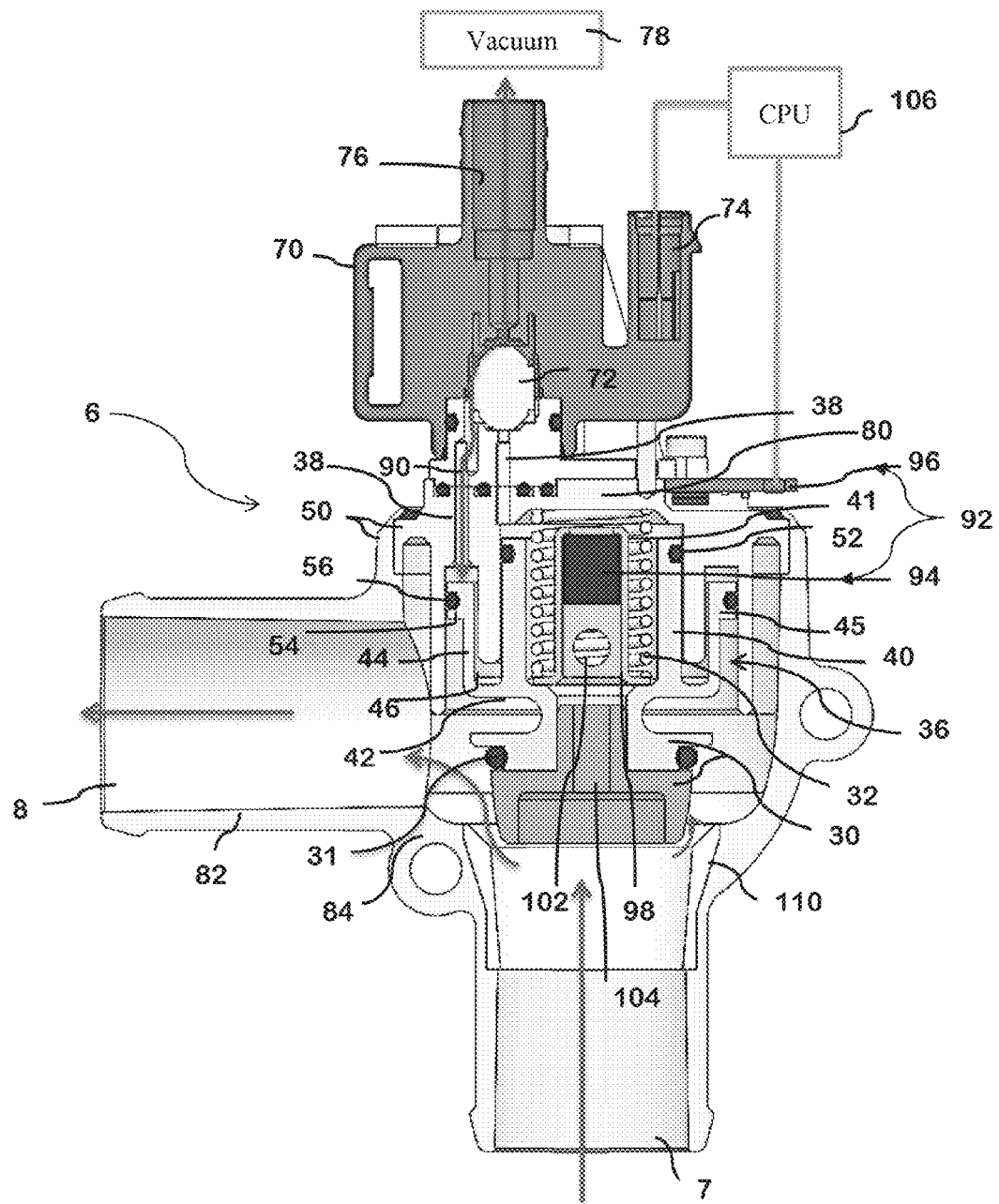
FIG. 2 is a cross-sectional view of one embodiment of a compressor recirculation valve in an open position.
Figure 3:
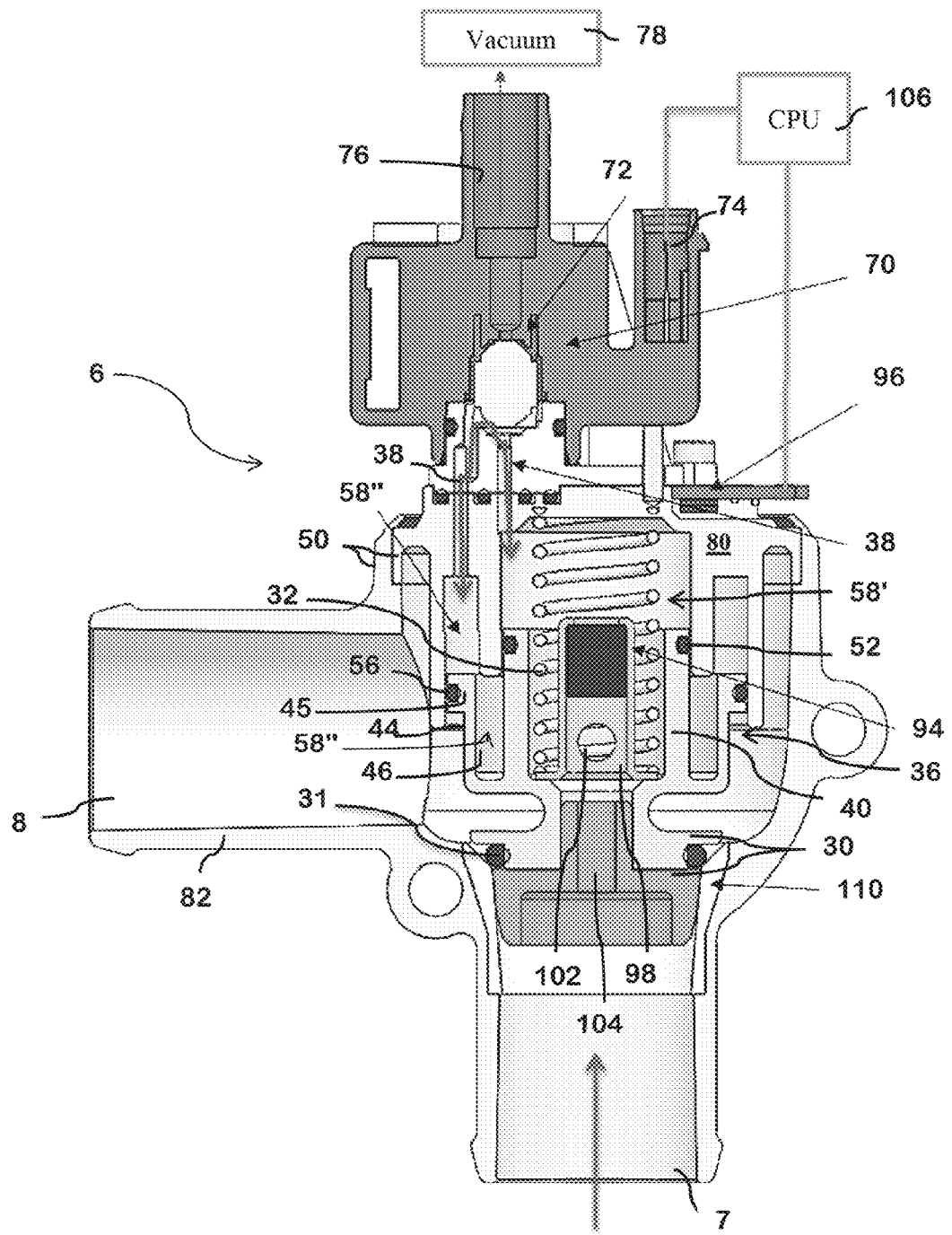
FIG. 3 is a cross-sectional view of the compressor recirculation valve of FIG. 2 in a closed position.

The CRV 6 in FIGS. 2-3, is a multi-chambered valve capable of employment in any EDT enabled ICE, including diesels, and capable of controlling the opening and/or closing of the valve, even to various partial open positions, in response to signals from a position sensor 92 included as part of the valve. CRV 6 includes a housing 50 having an inlet port 7 and the discharge port 8, one or more control ports 38 passing through the housing 50 that are connected to a control port valve 72 to open and close said control ports to access a source of pressure change (in FIGS. 2-3, an integral solenoid 70 with an armature is shown as the control port valve, but the invention is not limited thereto), and a piston 36 connected to a valve 30 seated within the housing. The housing 50 may be a one or two piece configuration. In a two piece embodiment, the housing may include a cover 80 and a main body 82. The solenoid 70 may be directly mounted to the cover 80 with the armature 72 in the fluid flowpath 90 (illustrated by the double-headed arrow) connecting the one or more control ports 38 to a pathway 76 through the solenoid 70 to a vacuum 78 (one example of a source of a pressure change). The direct mounting of the solenoid 70 eliminates the need for connecting hoses, shortens the pathway for faster reaction time, and overall is a more compact construction with less components for potential future failure. Other examples of a source of pressure change is any type of pump for moving a fluid in a positive direction, a negative direction, or alternating therebetween such as, but not limited to, an air pump, a hydraulic pump, a fluid injector, a vacuum pump.

The piston 36 includes a central shaft 40 having a first end 41 and a second end 42. The first end 41 includes a sealing member 52 such as, but not limited to, an O-ring for sealing engagement with a first portion of the housing 50. Extending from the second end 42 is a flange 44 extending toward the first end 41, but spaced a distance away from the central shaft 40 of the piston 36. The flange 44 terminates in a thickened rim 45 having a seat 54 for a second sealing member 56 such as, but not limited to, an O-ring. The second sealing member 56 also provide sealing engagement with a second portion of the housing 50. The flange 44 defines a general cup-shaped chamber 46 (best seen in FIG. 3) between the central shaft 40 and itself, and when housed inside housing 50 define a plurality of chambers 58' (innermost) and 58" (outermost). The piston 36 is movable between an open position (shown in FIG. 2) and a closed position (shown in FIG. 3) by the biasing spring 32, by positive or negative actuating pressure (provided, for example, by vacuum) through fluid flowpath 90, or a combination thereof.

The sealing member be any suitable seal or washer for sealing reciprocating components, including a lip seal. In an embodiment where at least one of the sealing members 52, 56 is an O-ring, the O-ring may have one of various cross-sectional profiles including a circular profile, an X-shaped profile, a square profile, a generally V-shaped profile, a generally U-shaped profile or other profiles suitable for sealing reciprocating components.

Still referring to FIGS. 2 and 3, the position sensor 92 may be any device that permits position measurement. In one embodiment, it is a relative position sensor (a displacement sensor) based on movement of the valve 30 relative to the opening it is seated in, whether in the inlet port 7 or the discharge port 8. The position sensor 92 may be a capacitive transducer, an eddy-current sensor, a grating senor, a Hall-effect sensor, an inductive non-contact position sensors, a laser Doppler Vibrometer (optical), a linear variable differential transformer (LVDT), a multi-axis displacement transducer, a photodiode array, a piezo-electric transducer (piezo-electric), a potentiometer, a proximity sensor (optical), a seismic displacement pick-up, a string potentiometer (also known as string pot, string encoder, cable position transducer), or a combination thereof.

In the embodiment illustrated in FIGS. 2 and 3, the position sensor 92 is a Hall effect sensor comprising a chip/Hall effect position sensor 96 that sensors the displacement of magnet 94, which is connected to the valve 30 for translation therewith. The magnet 94 may be mounted to or within the piston 36 or the valve 30, for example, the magnet 94 may be recessed into the valve 30 or the piston 36 (not shown). In FIGS. 2 and 3, the magnet 94 is housed within a bracket 98 connected to the piston 36. The bracket 98 suspends the magnet 94 within the innermost chamber 58' (labeled in FIG. 3) defined between the piston 36 and the housing 50. The bracket 98 includes one or more holes 102 therein leading into a pathway 104 through the valve 30 into fluid communication with the discharge port 8. The holes in the bracket 98 also place the inlet port 7 (or discharge port 8, depending upon the mounting orientation of the primary valve 30 within the housing 50 and the orientation of the CRV in the system), via pathway 104, in fluid communication with the innermost chamber 58'. The chip/Hall effect position sensor 96 may be positioned within the actuator structure in sufficient proximity to sense the movement of the magnet 94. In the embodiment in FIGS. 2 and 3, the chip/Hall effect position sensor 96 is oriented horizontally in a position above the magnet 94 as part of the cover 80, i.e., axial relative to the magnet 94. In another embodiment, the chip/Hall effect position sensor 96 may be oriented vertically in a position radially outward away from the magnet 94. The innermost chamber also houses a biasing member 32 in such a way that the magnet 94 does not interfere therewith.

Pathway 104, FIG. 2, is formed axially through the valve 30.

As discussed above, the control port valve 72 may be solenoid 70 and its armature 72 operable in response to instructions from a CPU 106 to turn on the solenoid 70 to move the armature 72 to open the fluid flowpath 90 (FIG. 2) between the outermost chamber 58" and the source of pressure change 78.

The present invention enables the ICE engineer to control the operating pressure of the exhaust manifold 12, 16 on command. By selectively opening the CRV 6, see FIG. 3, to a desired displacement, including a plurality of partial open positions, relative to the opening its seated in when in a closed position, the operating pressures can be controlled to produce a desired effect. In one embodiment, the operator is effectively controlling the operating pressure of the engine's intake manifold 5, 11 by utilizing the CRV 6. There exists several methodologies for controlling the opening and closing of embodiments of a CRV 6 that can produce the Effect. In one embodiment, the CRV 6 can be made to open naturally against a biasing spring 32, where when operating pressure exceeds the pre-load force of the spring, the CRV 6 opens and then regulates against the pre-load force to maintain a given operating pressure at the intake manifold 5, 11 (FIG. 1). Once signaled open, the CRV 6 operates similar to the previous example. Additionally, CRV 6, direct-acting or pneumatic, may be signaled to open by having a circuit apply a control frequency with a given duty cycle in order to produce a target operating pressure in the intake manifold 5, 11 against which to regulate, or perhaps determine the lift and position of the valve 30 in the CRV 6.

Herein, as seen in FIGS. 2 and 3, the selective metering (partial opening of the valve to a plurality of positions) is accomplished using the CPU 106 and the signals the CPU 106 receives from the position sensor 92. The selective metering is enhanced by the geometry of the valve seat 110 and the valve 30. In particular, the valve seat 110 and the valve 30 are shaped such that a slight displacement of the valve can partially open the discharge port.

A variety of control methodologies are known, or may be developed hereafter, that enable the sensing of system operating pressures or referencing the system operating pressure against the mechanical operation of a valve therein and thereafter produce an output to achieve an Effect. The system arrangements can be as fundamental as pneumatically communicating pressure signals that are produced in the system are to a mechanical actuators surface area acting against a spring bias. As system conditions change, then the performance of the actuator will change accordingly in a simple closed-loop logic. The control system can also increase in complexity to include pressure sensors that communicate signals to an electronic processing unit that integrates those signals electronically, or against a table of comparative values, and then output a control signal to a solenoid that will pneumatically control the actions of the actuator. As discussed in U.S. patent application Ser. No. 13/369,971, which is incorporated herein by reference in its entirety, the control of a valve in the position of the CRV 6 in FIG. 1 may be coordinated with the opening and closing of the wastegate 13 to control the boost pressure at the intake manifold 5, 11.

Having described the invention in detail and by reference to preferred embodiments thereof, it will be apparent that modifications and variations are possible without departing from the scope of the invention which is defined in the appended claims.

What is claimed is:

1. A variable flow valve with position feedback comprising:
    a housing having an inlet port and a discharge port, and one or more control ports in fluid communication with the interior of the housing;
    a piston connected to a primary valve, which are both seated within the housing to open and close fluid communication between the inlet port and the discharge port;
    wherein the housing and the piston intermesh to define an inner chamber and an outer chamber, the inner chamber being in fluid communication with one of the control ports and the outer chamber being in fluid communication with another of the control ports;
    a control port valve disposed to open and close at least one of the control ports access to a source of pressure change; and
    a position sensor having at least a component thereof connected to the primary valve to determine the position of the primary valve relative to the discharge port;
    wherein the position of the primary valve is used to communicate with the control port valve to hold the primary valve in a position where the discharge port is partially open.

2. The variable flow valve of claim 1, further comprising:
    a pathway formed axially through the primary valve to connect the inlet port to the inner chamber for fluid communication therebetween.

3. The variable flow valve of claim 1, wherein the control port valve opens and closes fluid communication between the control port in fluid communication with the inner chamber and the control port in fluid communication with the outer chamber.

4. The variable flow valve of claim 3, wherein when the primary valve is in a closed position, the control port valve is open thereby providing fluid communication between the inner chamber and the outer chamber, and when the primary valve is in a fully open position, the control port valve is closed thereby providing fluid communication between the outer chamber and the source of pressure change without fluid communication between the inner chamber and the outer chamber.

5. The variable flow valve of claim 1, wherein the discharge port has a tailored geometry shaped so that a slight displacement of the primary valve toward the fully open position partially opens the discharge port.

6. The variable flow valve of claim 1, wherein the position sensor is in signal communication with a CPU that controls the opening and closing of the control port valve.

7. The variable flow valve of claim 1, wherein the position sensor is a Hall effect sensor comprising a position magnet connected to the primary valve and a sensor chip proximate the position magnet to sense any change in position thereof.

8. A system for controlling an exhaust driven turbocharging system, comprising:
    a turbocharger having its compressor outlet in fluid communication with a variable flow valve and an air inlet of an engine, the variable flow valve comprising:
        a piston connected to a primary valve that controls fluid communication between an inlet port and a discharge port of a housing in which the primary valve is seated, wherein the housing and the piston intermesh to define an inner chamber and an outer chamber, the inner chamber is in fluid communication with a first control port and the outer chamber is in fluid communication with a second control port;
        a control port valve disposed to open and close at least one of the first and second control port access to a source of pressure change; and
        a position sensor having at least a component thereof connected to the primary valve to determine the position of the primary valve relative to the discharge port;
        wherein the position of the primary valve controls the opening and closing of the control port valve;
    wherein the position of the primary valve is used to communicate with the control port valve to hold the primary valve in a position where the discharge port is partially open thereby affecting the flow of air into the air inlet of the engine.

9. The system of claim 8, wherein the variable flow valve further comprises:
   a pathway formed axially through the primary valve to connect the inlet port to the inner chamber for fluid communication therebetween.

10. The system of claim 8, wherein the control port valve opens and closes fluid communication between the control port in fluid communication with the inner chamber and the control port in fluid communication with the outer chamber.

11. The variable flow valve of claim 10, wherein when the primary valve is in a closed position, the control port valve is open thereby providing fluid communication between the inner chamber and the outer chamber, and when the primary valve is in a fully open position, the control port valve is closed thereby providing fluid communication between the outer chamber and the source of pressure change without fluid communication between the inner chamber and the outer chamber.

12. The system of claim 8, wherein the discharge port has a tailored geometry shaped so that a slight displacement of the primary valve toward the fully open position partially opens the discharge port.

13. The system of claim 8, wherein the position sensor is in signal communication with a CPU that controls the opening and closing of the control port valve.

14. The system of claim 8, wherein the position sensor is a Hall effect sensor comprising a position magnet connected to the primary valve and a sensor chip proximate the position magnet to sense any change in position thereof.

* * * * *